April 5, 1949.   M. F. A. JULIEN   2,466,110
DEVICE FOR ABSORBING OSCILLATIONS
Original Filed March 9, 1945   2 Sheets-Sheet 1
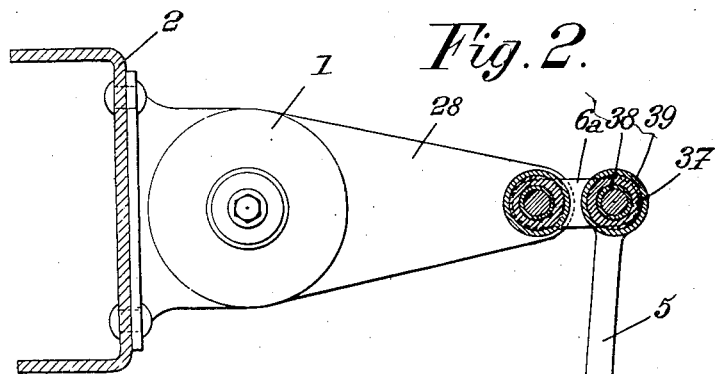
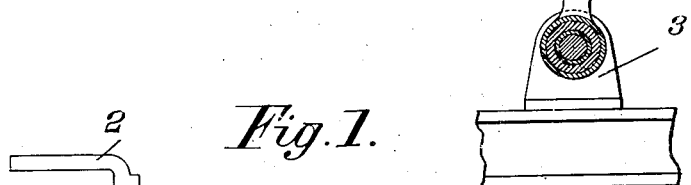
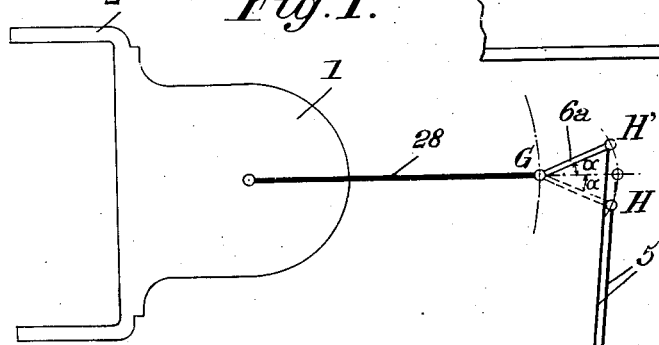
INVENTOR
MAURICE FRANCOIS ALEXANDRE JULIEN
BY Henry J. Lucke
ATTORNEY Patented Apr. 5, 1949

2,466,110

UNITED STATES PATENT OFFICE 2,466,110

DEVICE FOR ABSORBING OSCILLATIONS

Maurice Francois Alexandre Julien, Paris, France

Original application March 9, 1945, Serial No. 581,894. Divided and this application July 20, 1946, Serial No. 685,052. In France August 17, 1944

1 Claim. (Cl. 267—8)

The present invention which is a division of my U. S. patent application Ser. No. 581,894, now abandoned, for "Devices for absorbing oscillations" relates to devices for absorbing oscillations in systems of the kind including two parts movable with respect to each other and elastic means interposed between said parts so that various oscillation frequencies are produced in operation. The invention is more especially, although not exclusively, concerned with vehicles (either road or rail vehicles) provided with such elastic means interposed between the "suspended" part, constituted as a rule by the chassis-frame with its body or box, and the "unsuspended" part, constituted by the wheels.

The object of the present invention is to provide an oscillation absorbing device of the kind above referred to which is better adapted to meet the requirements of practice than those used up to the present time.

Other objects of my invention will result from the following detailed description of some specific embodiments thereof.

A preferred embodiment of my invention will be hereinafter described, with reference to the accompanying drawings, given merely by way of example, and in which:

Fig. 1 is a diagrammatical view illustrating the principle of the present invention.

Fig. 2 is an elevational view of a shock absorbing device made on the principle shown by Fig. 1;

Figure 3:
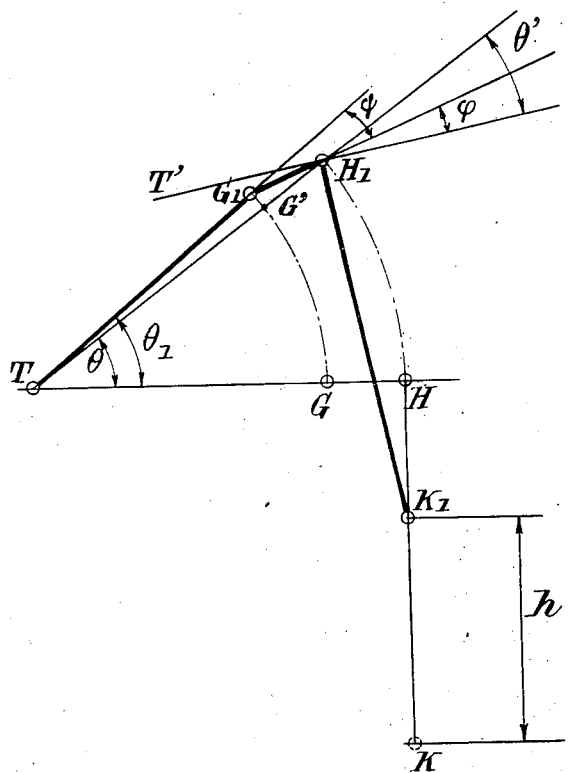
Fig. 3 is a diagram illustrating the operation of the device of Fig. 2.

In the following description, it will be supposed that the absorbing device is applied to the case of a vehicle, and more particularly an automobile vehicle.

In the drawings, I have shown at 1 a shock absorber transmitting substantially without absorption high frequency oscillations from one to the other of the elements between which it is interposed. This shock absorber may be of any conventional type, for instance of the liquid friction or the dry friction type, corresponding to a rotary or translatory relative motion of its parts. It is supported by the vehicle frame 2 and includes an oscillating arm 28 to which the effort to be absorbed is transmitted from the axle or other part 3.

According to my invention, the connecting means between axle 3 and arm 28 include at least two jointed links or rods such as 5 and 6a, one of which, to wit 5, is mounted in the same place and position as the usual connecting rod, while the other, to wit 6a, is preferably substantially shorter and disposed transversely to the first, i. e. in line with arm 28.

This link system is, according to my invention, combined with elastic means, preferably in torsion, for developing an auxiliary antagonistic effort which increases gradually with the displacements and such that, for small amplitude displacements of the suspended and unsuspended parts with respect to each other the effort transmitted to shock absorber 1 is small, or even zero.

According to the embodiment illustrated by Fig. 2, the elastic means in question are constituted by rubber masses in torsion about at least one of the articulation axes such as G, H and K, and in particular about axes G and H about which rod 6a is connected with arm 28 and rod 5 respectively.

By suitably calculating these rubber masses, account being taken of the length of rod 6a and of the various lever arms, it is possible to obtain an operation such that, for displacements of small amplitude, arm 28 remains practically stationary, the displacements of axle 4 with respect to the vehicle frame merely producing oscillations of rod 6a on either side of its middle position with a maximum angular amplitude $\alpha$ while, for more important displacements, the antagonistic effort that is produced about articulation axes G and H is sufficient for overcoming the resistance of shock absorber 1, which is then accordingly brought into action.

The desired result is therefore obtained.

Concerning now the manner in which the elastic means in question are constructed, it seems advantageous to make use of so-called "Flexibloc" devices including at least one rubber ring or sleeve tightly held between cylindrical or other suitable metal fittings (or eventually secured directly to the parts to be connected together by such a joint). It will be necessary to ensure a sufficient adhesion of the rubber mass to its metal fittings or other parts, in order to avoid slipping which might prevent the return of the device to its initial position. Of course, other devices giving the same result may be used.

Concerning rod 6a, it is advantageously given the shape of a shackle the end portions of which are mounted on either side of the rubber rings and their metal fittings.

In Fig. 2, I have shown one of the embodiments which may be employed according to the present invention, the rubber material being shown at 37 and the corresponding metal fittings at 38 and 39.

It should be further noted that the system which has been just described tends to increase the maximum amplitude of the angular displacement of the arm 28 of the shock absorber. This is demonstrated by Fig. 3.

In this figure, I have shown a relative displacement $h$ of the axle from K to $K_1$, corresponding to a displacement of point H from H to $H_1$. If the transmission did not include link or shackle $6a$, arm 28 would pass from its position of rest TH to position $TH_1$ and the corresponding angular displacement would be $\theta$.

Let it be supposed that, in the initial position, a long line T G H, rod KH is at right angles to arm TGH. Line T' $H_1$ is a perpendicular traced from point $H_1$ to line $K_1H_1$.

If the elastically mounted shackle did not exist, that is to say if there was only one elastic joint, located at $H_1$, this joint would have undergone an elastic torsion equal to T' $H_1$ T, that is to say $\theta'$, this angle being but little different from angle $HTH_1$ that is to say $\theta$.

But, as a matter of fact, when use is made, according to the invention, of a shackle $6a$ with elastic joints at both ends, the torsions are divided equally between the two elastic joints, with a certain approximation represented by an angle $\alpha_1$ corresponding to the shackle return torque necessary for overcoming the friction of the shock absorber.

Under these conditions, point G does not come into position G', as above supposed, but into a position $G_1$ such that the true rotation angles $\varphi$ and $\psi$ of the two respective joints at the ends of the shackle are equal and approximate $$\frac{\theta}{2}\left(\text{or } \frac{\theta'}{2}\right)$$

and this, with a maximum error of $\alpha_1$, as above stated.

It is therefore finally clear that the true rotation angle $\theta_1$ of the shock absorber is greater than the angle that would have been obtained if intermediate shackle $6a$ had not been provided according to the invention.

Such a device has many advantages over suspension systems for vehicles as used prior to my invention, among which the following seem to be particularly important for practical purposes:

The construction is particularly simple.

The dimensioning of the elastic joints is facilitated and their duration is increased due to the fact that the angles of twisting are divided by two as compared with what takes place in the known arrangements including a single joint.

Finally, the actual amplitude of the relative displacement of the main shock absorber elements is increased.

While I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

For use in connection with a vehicle including wheels and at least one part suspended with respect to said wheels, a shock absorbing device which comprises, in combination, a shock absorber carried by said part, said shock absorber being of the kind transmitting high frequency oscillations substantially without absorption, a member of said shock absorber being movable along a given path of travel with respect to said part, a rod member pivotally connected to the axle of one of said wheels and extending normally in a direction making an acute angle with said path of travel, a shackle pivoted at its ends to said members respectively extending normally in a direction substantially perpendicular to said path of travel, and an annular rubber mass coaxially disposed in the articulation between said shackle and each of said members with its cylindrical faces made fast to said shackle and said member respectively for resiliently opposing relative angular displacements thereof in both directions.

MAURICE FRANCOIS ALEXANDRE JULIEN.

REFERENCES CITED

The following references are of record in the file of this patent:

UNITED STATES PATENTS

| Number | Name | Date |
| --- | --- | --- |
| 1,913,513 | Rossman et al. | June 13, 1933 |
| 1,940,330 | Sinclair et al. | Dec. 19, 1933 |
| 2,068,676 | Hickman | Jan. 26, 1937 |
| 2,145,671 | Tjaarda | Jan. 31, 1939 |
| 2,176,159 | Trask | Oct. 17, 1939 |
| 2,198,616 | Hickman | Apr. 30, 1940 |
| 2,274,227 | Willard | Feb. 24, 1942 |
| 2,387,732 | Bailey | Oct. 30, 1945 |